March 9, 1965  Q. A. HANSEN  3,172,514
ELECTROMAGNETIC COUPLINGS
Filed Sept. 15, 1959  2 Sheets-Sheet 1
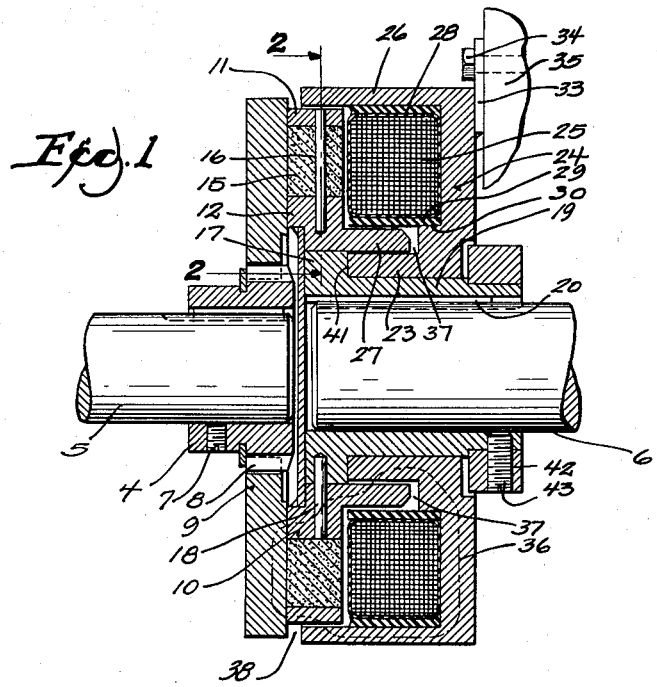
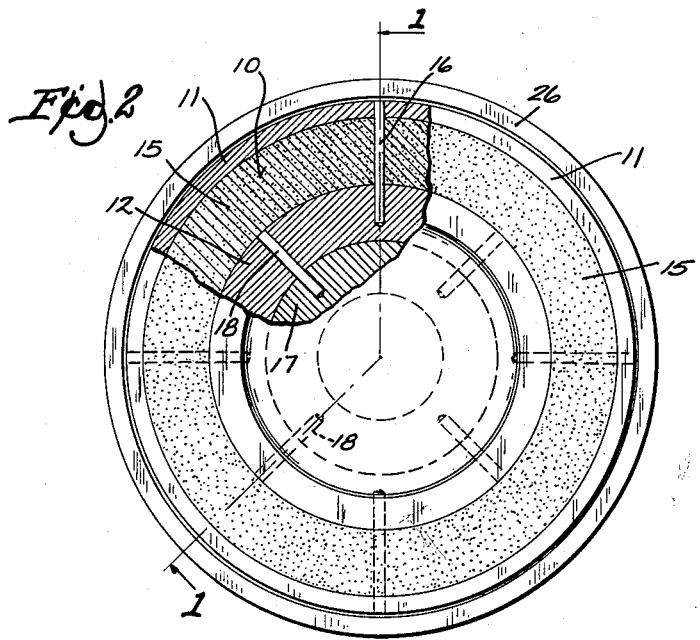
INVENTOR.
QUINTEN A. HANSEN
BY
Wheeler, Wheeler & Wheeler
ATTORNEYS March 9, 1965  Q. A. HANSEN  3,172,514
ELECTROMAGNETIC COUPLINGS
Filed Sept. 15, 1959  2 Sheets-Sheet 2

INVENTOR.
QUINTEN A. HANSEN
BY
Wheeler, Wheeler & Wheeler
ATTORNEYS

United States Patent Office 3,172,514
Patented Mar. 9, 1965

3,172,514
ELECTROMAGNETIC COUPLINGS
Quinten A. Hansen, Franksville, Wis., assignor to R. H. Stearns and R. N. Stearns, both of Milwaukee, Wis.
Filed Sept. 15, 1959, Ser. No. 840,197
1 Claim. (Cl. 192—84)

This invention relates to improvements in electromagnetic couplings.

Electromagnetic couplings embodying the present invention are adapted to couple aligned shafts in a structural relation in which all of the parts of the coupling are supported on the shafts, no part requiring extraneous support. Accordingly, the coupling can very easily be applied to the aligned shafts, it being necessary only to fix one of the coupling parts against rotation with respect to another part.

An important feature of one of the embodiments of the present invention is a non-magnetic rotor hub which intervenes between the field frame of the electromagnet and its support shaft, thus to prevent magnetic flux leakage between the field frame and the shaft. The hub provides integrally a bearing on which the field frame is rotatable with respect to the shaft, no intervening bearing structure being required. Moreover, the hub is provided with a radial shoulder which abuts axially against a radial face of one of the poles of the field frame, thus to fix the axial position of the parts and to oppose and contain axial thrust which might otherwise tend to cause the parts to shift axially.

The elimination of intervening bearings and the stabilizing of the axial position of the parts means that closer tolerances in air gap dimensions can be maintained. There is also more room for the electromagnetic coil than would otherwise be the case.

In another embodiment of the invention a ball bearing is interposed between the rotor hub and the field frame. In the preferred arrangement in this embodiment the ball bearing occupies only a part of the space between the hub and the field frame, leaving the other part unobstructed for relatively rapid heat exchange between the frame and the atmosphere, thus to cool the coil.

Other objects, advantages and features of the invention will appear from the following disclosure in which:

FIG. 1 is a cross section taken through one form of magnetic clutch embodying my invention, this view being taken along line 1—1 of FIG. 2.

FIG. 2 is a view partly in end elevation and partly in cross section taken along the line 2—2 of FIG. 1.

Figure 3:
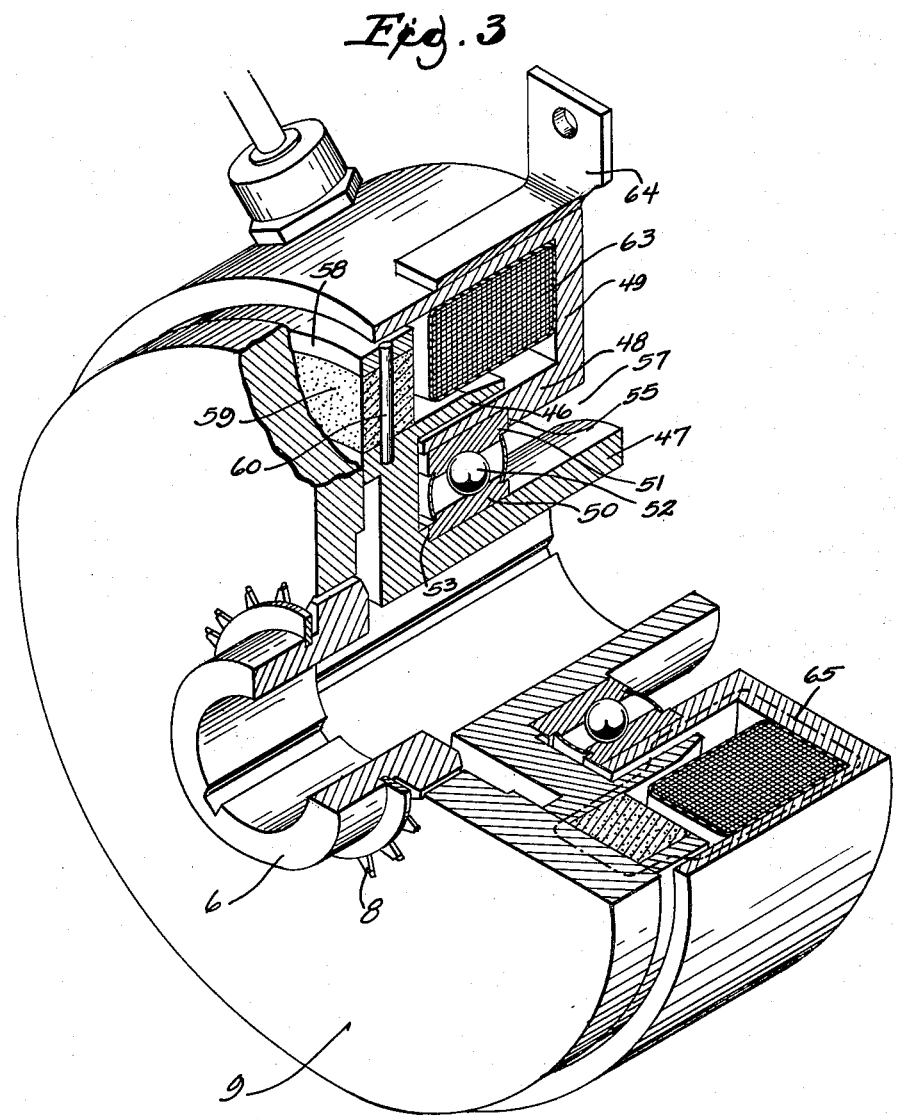
FIG. 3 is a cutaway perspective view of another embodiment of the invention.

As best shown in FIG. 1, the device of the present invention couples aligned shafts 5, 6. Collar 4 is fixedly secured to the shaft 5 by means of set screw 7. Collar 4 has splines 8 on which an annular armature plate 9 is constrained for rotation with the shaft 5, but is free for limited axial movement with respect thereto.

All other parts of the coupling are mounted on the end of the other shaft 6. These parts comprise a rotor 10 which faces the annular armature 9 and which consists of an outer magnetic ring 11, an inner magnetic ring 12 which is spaced radially inwardly from ring 11 and between which rings 11, 12 is interposed annular ring 15 of conventional friction brake or clutch material which may be replaced periodically as it is worn out. While the rings 11 and 12 may be bonded adhesively to the friction material 15, I may also interconnect these parts by radial pins 16, as shown in the instant drawings.

The rotor parts aforesaid are fixed to and supported upon the shaft 6 by means of a non-magnetic hub 17 which is desirably interconnected with ring 12 by radial pins 18. Hub 17 has an axially extending sleeve portion 19 fixedly connected to shaft 6 by key 20.

The hub 17 and its sleeve 19 are desirably made of a non-magnetic self-lubricating bearing material such as oilite bronze. Accordingly, the hub sleeve 19 also provides a bearing surface for the inner pole flange 23 of a magnetic field frame 24 for the electromagnetic coil 25. Field frame 24 has an outer pole flange 26 which axially overlaps in radially spaced relationship the outer ring 11 of the rotor 10. Inner rotor ring 12 has a sleeve portion 27 which axially overlaps and is radially spaced from the pole flange 23.

Coil 25 is fastened to the field frame 24 by adhesive 28 and also by a non-magnetic sleeve 29 which bears radially on a shoulder 30 formed between pole flange 23 and field frame 24. Sleeve 29 is desirably made of "Bakelite" or like electrically insulating material.

The field frame 24 is provided with a torque arm bracket 33 adapted to be fastened by means of a bolt 34 or the like to any convenient stationary element 35. Accordingly, the field frame 24 and its poles 23, 26 are held against rotation with the shaft 6, although these parts are rotatably supported on the shaft 6 on the bearing surfaces of the hub sleeve 19.

In the preferred construction illustrated, the pole flanges 23, 26 embrace the rings 11, 27 of the rotor 10. Ring 27 intervenes between the pole flange 23 and the coil 25. Flux will be transferred from the respective poles 23, 26 across the radial air gaps respectively between pole 23 and ring 27 and between pole 26 and ring 11. The flux will generally follow the broken line path 36. The axial space 37 between the end of ring 27 and the radial surfaces of field frame 24 and the axial space 38 between the end of pole 26 and the radial surface of armature 9 are respectively much greater than the radial air gaps between the poles and rings so that axial thrust caused by the energization of coil 25 will be at a minimum.

The radial shoulder 41 between the hub 17 and its extension 19 will provide a radial bearing surface for the end of the pole 23, thus to fix the position of the parts axially and prevent any axial movement thereof which might otherwise be caused by magnetic thrust. The field frame 24 is held against slipping off of bearing surface 19 by a ring 42 held to the extreme end portion of bearing 19 by a set screw 43.

In this embodiment of the invention the non-magnetic hub 17 and sleeve 19 intervene between the magnetic pole 23 and the shaft 6, which is usually of magnetic material. Accordingly, the hub 17 and sleeve 19 block flux leakage to the shaft and improve the magnetic circuit.

In the embodiment of the invention shown in FIG. 3, the same general relationship of parts is maintained. In this embodiment, however, the rotor ring 46 is made integral with the hub 47. Both of these parts are made of magnetic material. Moreover, the inner pole flange 48 of the field frame 49 is supported on an anti-friction bearing structure which includes an inner race 50, an outer race 51 and intervening bearing balls 52. Race 50 bears on shoulder 53 on ring 47 and race 51 bears on shoulder 55 on pole flange 48.

Races 50, 51 are desirably only about one-half the length of pole 48 and hub sleeve 47. A single bearing structure is used and this is positioned at the extreme end of the space 57 between pole 48 and sleeve 47. Accordingly, a substantial surface of pole 48 is exposed for dissipation of heat from coil 63. Only about one-half of space 57 is occupied by the bearing.

As in the previously described embodiment of the invention, the rotor is also provided with an outer ring 58 and a friction surface 59, both attached to the hub 47 by radial pins 60.

The field frame 49 carries a field coil 63 and is also provided with a torque arm bracket 64 for anchoring the field frame against rotation on its supporting shaft, as in the previously described embodiment of the invention. The flux is transferred across radial air gaps without any substantial axial thrust being imposed upon the parts. The path of the flux is shown in broken lines at 65 in FIG. 3.

What is claimed is:

A magnetic coupling for aligned shafts comprising a splined hub fixable on one of the shafts, an armature disk mounted on said splined hub, a second hub fastenable to the other of said shafts, said hub being fabricated of non-magnetic, self-lubricating material and including a cylindrical bearing surface and an annular flange providing radially extending bearing surface adjacent to one end of said cylindrical bearing surface, a field magnet having inner and outer pole flanges, said inner pole flange being rotatably engaged on said cylindrical bearing surface with one end of said inner pole flange bearing against said radially extending bearing surface to limit axial movement of said field magnet relative to said second hub, a coil carried by said field magnet, inner and outer polar rings lapping the respective pole flanges, the inner polar ring being mounted peripherally on the annular flange of the second hub and extending axially between the coil and the inner pole flange, means physically connecting said inner and outer polar rings with said second hub, and means for securing the field magnet against rotation while supporting the weight thereof by rotatable engagement of said inner pole flange on said cylindrical bearing surface.

References Cited by the Examiner
UNITED STATES PATENTS

| | | | |
|---|---|---|---|
| 1,896,972 | 2/33 | Redmond | 310—254 |
| 2,729,318 | 1/56 | Harter. | |
| 2,864,478 | 12/58 | Harter et al. | 192—84 |
| 2,899,037 | 8/59 | Pierce. | |
| 2,958,406 | 11/60 | Pierce. | |
| 3,036,680 | 5/62 | Jaeschke. | |

DAVID J. WILLIAMOWSKY, *Primary Examiner.*

THOMAS J. HICKEY, *Examiner.*